United States Patent
Chainer et al.

(10) Patent No.: US 6,469,859 B1
(45) Date of Patent: Oct. 22, 2002

(54) METHOD AND SYSTEM FOR ACCURATE SELF-SERVOWRITING WITH NORMALIZATION IN A DISK DRIVE

(75) Inventors: Timothy Chainer, Mahopac, NY (US); Mark Delorman Schultz, Elmsford, NY (US); Bucknell Chapman Webb, Ossinging, NY (US); Edward John Yarmchuk, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/198,730

(22) Filed: Nov. 24, 1998

Related U.S. Application Data

(62) Division of application No. 08/677,144, filed on Jul. 9, 1996, now Pat. No. 5,875,064.

(51) Int. Cl.[7] .............................................. G11B 21/02
(52) U.S. Cl. .................................................... 360/75
(58) Field of Search ........................ 360/75, 51, 77.08, 360/77.05, 77.62, 78.04, 75.48

(56) References Cited

U.S. PATENT DOCUMENTS

| | | | |
|---|---|---|---|
| 3,540,022 A | 11/1970 | Berger | 340/174.1 |
| 3,881,184 A | 4/1975 | Koepcke et al. | |
| 4,068,218 A | 1/1978 | Likuski | 365/237 |
| 4,107,746 A | 8/1978 | Conway | |
| 4,414,589 A | 11/1983 | Oliver et al. | |
| 4,530,019 A | 7/1985 | Penniman | |
| 4,531,167 A | 7/1985 | Berger | |
| 4,561,028 A | 12/1985 | Guisinger | |
| 4,586,094 A | 4/1986 | Chambors et al. | |
| 4,598,327 A | 7/1986 | Jen et al. | |

(List continued on next page.)

FOREIGN PATENT DOCUMENTS

| | | |
|---|---|---|
| JP | 61-170932 | 8/1986 |
| JP | 63-00872 | 1/1988 |
| JP | 63-63183 | 3/1988 |
| JP | 40-23276 | 1/1992 |
| JP | 04-038778 | 2/1992 |
| JP | 96-019178 | 11/1995 |
| WO | 94/11864 | 5/1994 |

OTHER PUBLICATIONS

IBM TDB Bulletin, P.J. Elliott, "Data Head Self Servowrite", vol. 32, No. 9A, Feb. 1990, pp 20–22.
Research Disclosure, 33761, pp 375, May 1993.

(List continued on next page.)

*Primary Examiner*—David Hudspeth
*Assistant Examiner*—K. Wong
(74) *Attorney, Agent, or Firm*—Monica D. Lee; Kunzler & Associates

(57) ABSTRACT

An accurate and time-efficient method and system for self-servowriting wherein at least one reference value used to position the transducer is updated for some, but not all, of the tracks to be written. The reference value(s) is dependent upon a predefined indicium of transducer position, such as the amplitude of the readback signal obtained from a written track when the transducer is positioned on the track. In a first embodiment, updating of the reference value(s) is performed at every Nth track written, where N is a fixed number or range of numbers determined by an expected track-to-track variation of the indicium. The servowriting system may be designed to dynamically increase or decrease N during servowriting in response to actual variations in the indicium. According to a second embodiment, updating is only performed when needed, e.g. when the variation of the measured indicium between two written tracks (not necessarily adjacent tracks) exceeds a predefined threshold value. For systems employing dual-element heads, servowriting accuracy is enhanced by performing a read head adjustment prior to updating of the reference values.

26 Claims, 9 Drawing Sheets

U.S. PATENT DOCUMENTS

| | | |
|---|---|---|
| 4,642,709 A | 2/1987 | Vinal |
| 4,729,048 A | 3/1988 | Imakoshi et al. ............ 360/103 |
| 4,734,900 A | 3/1988 | Davie ........................... 369/59 |
| 4,809,091 A | 2/1989 | Miyazawa et al. ............ 360/48 |
| 4,879,608 A | 11/1989 | Sano ............................ 360/51 |
| 4,910,616 A | 3/1990 | Sirai et al. ................ 360/77.08 |
| 4,912,576 A | 3/1990 | Janz ......................... 360/77.07 |
| 4,942,484 A | 7/1990 | Nigam ......................... 360/46 |
| 5,003,412 A | 3/1991 | Bizjak et al. ............. 360/77.01 |
| 5,119,248 A | 6/1992 | Bizjak et al. .................. 360/75 |
| 5,164,866 A | 11/1992 | Sano et al. .............. 360/77.08 |
| 5,175,719 A | 12/1992 | Iimura .......................... 369/58 |
| 5,193,034 A | 3/1993 | Tsuyoshi et al. .............. 360/51 |
| 5,202,802 A | 4/1993 | Sidman .................... 360/77.05 |
| 5,229,901 A | 7/1993 | Mallary ....................... 360/104 |
| 5,241,433 A | 8/1993 | Anderson et al. ........ 360/77.04 |
| 5,256,965 A | 10/1993 | Nomura ...................... 324/212 |
| 5,321,560 A | 6/1994 | Cowen ......................... 360/48 |
| 5,339,207 A | 8/1994 | Moon et al. ............. 360/77.05 |
| 5,416,652 A | 5/1995 | Lewis .......................... 360/48 |
| 5,444,583 A | 8/1995 | Ehrlich et al. ........... 360/78.09 |
| 5,448,429 A | 9/1995 | Cribbs et al. ................. 360/75 |
| 5,465,182 A | 11/1995 | Ishikawa ..................... 360/75 |
| 5,475,291 A | 12/1995 | Yoshida et al. ......... 318/568.22 |
| 5,485,322 A | 1/1996 | Chainer et al. ................ 360/51 |
| 5,517,371 A | 5/1996 | Takei |
| 5,541,784 A | 7/1996 | Cribbs et al. .................. 360/75 |
| 5,570,247 A | 10/1996 | Brown et al. .................. 360/75 |
| 5,581,420 A | 12/1996 | Chainer et al. ............... 360/75 |
| 5,606,469 A | 2/1997 | Kosugi et al. |
| 5,612,833 A | 3/1997 | Yarmchuk et al. ............. 360/75 |
| 5,615,058 A | 3/1997 | Chainer et al. ................ 360/51 |
| 5,757,574 A * | 5/1998 | Chainer et al. ............... 360/75 |
| 5,875,064 A * | 2/1999 | Chainer et al. ............... 360/75 |

OTHER PUBLICATIONS

IBM TDB Bulletin, Anonymous, "Regenerative Clock Technique for Servo Track Writers", vol. 33, No. 5, pp 310–311, Oct. 1990.

IBM TDB Bulletin, E.G. Nassimbene, "High Track Density Floppy Disk File", vol. .26, No. #A, pp 1275–1276, Aug. 1983.

IEEE Tansactions on Magnetics,"Erase Profiles of Floppy Disk Heads", vol. Mag–20, No. 4 pp 528–541, Jul. 1984.

* cited by examiner

METHOD AND SYSTEM FOR ACCURATE SELF-SERVOWRITING WITH NORMALIZATION IN A DISK DRIVE

This is a divisional application of U.S. patent application Ser. No. 08/677,144, filed Jul. 9, 1996, now U.S. Pat. No. 5,875,064.

CROSS REFERENCE TO RELATED APPLICATION

This application is related to U.S. patent application Ser. No. 08/349,028, filed on Dec. 2, 1994, from which continuation in part U.S. patent application Ser. No. 08/405,261 also stems; U.S. patent application Ser. No. 08/348,773, filed on Dec. 1, 1994, from which one divisional application stems; and U.S. patent application Ser. No. 08/028,044, filed on Mar. 8, 1993, from which three divisional applications stem, one having issued on Jan. 16, 1996 as U.S. Pat. No. 5,485,322; all commonly assigned herewith and expressly incorporated by reference.

BACKGROUND OF THE INVENTION

Field of the Invention

The invention relates generally to data storage devices wherein data access is achieved by positioning a transducer relative to a storage medium, positioning being controlled by a servo system in response to positional information. More particularly it relates to an improved disk drive apparatus and method for writing positional information to the medium.

Increased levels of storage capacity in storage devices such as hard disk drives (optical or magnetic, for example) and removable storage media (removable disk or removable tape drives, for example) are a direct result of the higher track densities possible with voice-coil and other types of servo positioners as well as the ability to read and write narrower tracks by using, for example, magnetoresistive (MR) head technology. Head positioning is accurately controlled using positional information stored on the disk itself, as in dedicated and embedded servo architectures.

Conventional servo-patterns, e.g. in an "embedded servo" disk drive, typically comprise short bursts of a constant frequency signal, very precisely offset to either side of a data track's center line. The bursts precede data regions of the track and are used to align a head with respect to the track center. Staying on track center is required during both reading and writing for accurate data storage and retrieval. Since there can be, for example, sixty or more data regions per track, that same number of servo data areas are preferably distributed around a track to provide means for a head to follow the track's center line as the disk rotates, even when the track is out of round, e.g., as a result of spindle wobble, disk slip and/or thermal expansion. As technology advances to provide smaller disk drives and increased track densities, the accurate placement of servo data must also increase proportionately.

Servo-data are conventionally written by costly dedicated servowriting equipment external to the disk drive equipped with large granite blocks for stably supporting the drive and quieting external vibrational effects. An auxiliary clock head is inserted onto the surface of the recording disk to write a reference timing pattern, and an external head/arm assembly is used to precisely position the transducer. The positioner includes a very accurate lead screw and a laser displacement measurement device for positional feedback. Servotracks are written on the media of a head disk assembly (HDA) with a specialized servowriter instrument. Laser positioning feedback is used in such instruments to read the actual physical position of a recording head used to write the servotracks.

A disadvantage of servo writers such as those described is that they require a clean room environment, as the disk and heads will be exposed to the environment to allow the access of the external head and actuator. Additionally, it is becoming more and more difficult for such servowriters to invade the internal environment of a HDA for servowriting because the HDAs themselves are exceedingly small and depend on their covers and castings to be in place for proper operation. Some HDAs, for instance, are the size and thickness of a plastic credit card.

In view of these challenges, a disk drive able to perform self-servo writing would be tremendously advantageous. However, this approach presents a new set of challenges. Specifically, self-servowriting systems are more prone to mechanical disturbances. Moreover, because of the interdependency of propagation tracks in self-servowriting, track shape errors introduced by mechanical disturbances and other factors may be amplified from one track to the next when writing the propagation tracks. Thus a self-servowriting system must be able to write servopatterns with a high degree of accuracy to meet the stringent requirements of high density disk drives.

Servopatterns consist of bursts of transitions located at intervals around the disk surface. In self-propagation, the radial position signal that is used to servo-control the actuator is derived from measurements of the readback amplitude of patterns that were written during a previous step of the servowrite process. That is, the burst edges of a written track comprise a set of points defining a track shape that the servo controller will attempt to follow when writing the next track. Thus, errors in the transducer position during burst writing appear as distortions away from a desired circular track shape. The servo controller causes the actuator to follow the resulting non-circular trajectory in a next burst writing step, so that the new bursts are written at locations reflecting (via the closed-loop response of the servo loop) the errors present in the preceding step, as well as in the present step. Consequently, each step in the process carries a "memory" of all preceding track shape errors. This "memory" depends on the particular closed-loop response of the servo loop.

Effects that result in track shape errors include, for example, random mechanical motion and modulation in the width of the written track that results from variations in the properties of the recording medium or in the flying height of the transducer Uncontrolled growth of such errors can lead to excessive track non-circularity. In some cases, error compounding may even lead to exponential growth of errors, exceeding all error margins and causing the self-propagation process to fail. Consequently, self-servowriting systems must provide a means for accurately writing servopatterns while controlling the propagation of track shape errors.

One self-servo writing method is disclosed in U.S. Pat. No. 4,414,589 to Oliver et al., which teaches optimization of track spacing. Head positioning is achieved in the following manner. First, one of the moving read/write heads is positioned at a first stop limit in the range of movement of the positioning means. The head is used to write a first reference track. A predetermined percentage of amplitude reduction, X%, is selected that empirically corresponds to the desired average track density. The moving head reads the first reference track and is displaced away from the first stop limit until the amplitude of the signal from the first reference track is reduced to X% of its original amplitude. A second reference track is then written by the head at the new location, read, and the head is again displaced in the same direction until the amplitude of signal from the second reference track is reduced to X% of its original value. The process is continued until the disc is filled with reference tracks. The average track density is checked to insure that it is within a predetermined acceptable range of the desired average track density. If the average track density is too high or too low, the disk is erased, the X% value is appropriately lowered or increased, and the process is repeated. If the average track density is within the predetermined acceptable range, the desired reduction rate X% for a given average track density has been determined and the servo writer may then proceed to the servo writing steps. Thus while Oliver provides a means for positioning the heads, it fails to teach how to limit the growth of errors during the radial propagation.

U.S. Pat. No. 4,912,576 to Janz and U.S. Pat. No. 5,448,429 to Cribbs et al. describe methods for writing a servo-pattern with a disk drive's own pair of transducers. Three types of servo-patterns are used to generate three-phase signals that provide a difference signal having a slope directly proportional to velocity. Janz observes that the signal level from a transducer is a measure of its alignment with a particular pattern recorded on the disk. For example, if the flux gap sweeps only forty percent of a pattern, then the read voltage will be forty percent of the voltage maximum obtainable when the transducer is aligned dead-center with the pattern. Janz uses this phenomenon to position the heads by straddling two of three offset and staggered patterns along a centerline path intended for data tracks. In a preferred process, Janz describes a dedicated servo architecture wherein one side of a disk is reserved for servo and the other side for data. The disk drive includes two transducers on opposite surfaces that share a common actuator. To format an erased disk for data initialization, a first phase servo is written on the servo side at an outer edge. The transducers are then moved-in radially one half of a track, as indicated by the first phase servotrack amplitude, and a first data-track is recorded on the data side. The transducers are again moved radially inward one half of a track, this time as indicated by the first data-track amplitude, and a second phase servotrack is recorded on the servo side. This sequence is repeated until both surfaces are entirely written. If too few or too many tracks are written, the disk is reformatted with a slight adjustment to the step width, as determined by the track count. Once the disk drive has been formatted with an entire compliment of properly spaced servotracks, the data-tracks are erased in preparation for receiving user data. Unfortunately, the method described by Janz requires a dedicated disk surface for servotracks and two heads working in tandem. Moreover, transducer flying height variations, spindle runout, and media inconsistencies can corrupt radial position determinations that rely on a simple reading of off-track read signal amplitudes. Prior art methods do not address these issues and are therefore inadequate for high performance disk drives applications.

Cribbs et al. teaches a hard disk drive system with self-servowriting capability comprising a rotating recording disk, transducer in communication with the disk surface, servo-actuator means for radially sweeping the transducer over the surface, a variable gain read amplifier (VGA) coupled to the transducer, an analog to digital converter (ADC) coupled to the VGA, an erase frequency oscillator coupled to the transducer for DC erasing of the disk surface, a memory for storing digital outputs appearing at the ADC, and a controller for signaling the servo-actuator to move to such radial positions that result in transducer read amplitudes that are a percentage of previous read amplitudes represent in the digital memory.

Again, the problem of growth of errors is not specifically addressed by Cribbs et al. The reference notes that track width modulation arising from flying height variations is a source of track shape error that impacts the self-propagation process. A procedure is outlined in which three extra revolutions of the disk are used to smooth the servo error control signals so as to reduce "hunting" and "dithering" of the servo actuator before each step of writing propagation bursts. It is unlikely that track width modulation large enough to result in excessive "hunting" could occur within any one step of burst writing, particularly since width modulation is a secondary effect compared to on-track readback modulation, and since a preliminary step in the Cribbs process is to reject all disk files having excessive on-track modulation. It is more likely that, in accordance with our experiences and detailed analysis, intrinsic track width modulation typically appears at the level of only a few percent of the track width, but through error compounding track noncircularities grow to much larger levels. It is also apparent that a signal discernible in the position error signal of a high gain servo loop is indicative of an underlying track shape error far greater than the error signal itself. This follows from the fact that the position error signal is merely the residual part of the underlying track shape error that the servo loop was unable to follow. Thus, as previously suggested, Cribbs'procedure for adjusting target amplitudes while track following in order to smooth the position error signal is one in which the underlying track shape error appears to be merely hidden, not eliminated.

Even assuming that the smoothing method works for all types of servo loops, which is unlikely, the solution proposed in Cribbs et al. is unattractive because three extra revolutions of the disk are required at each step in the process. Consequently, this approach doubles the servowrite time and raises the implementation cost.

Commonly assigned U.S. patent application Ser. No. 08/349,028 (now U.S. Pat. No. 5,612,833) and Ser. No. 08/405,261 describe self-servowriting systems which overcome the previously described problems. Head positioning is achieved by first writing a reference track, e.g. with a plurality of propagation bursts, then moving the head to a next position while reading the reference track until it is determined that the amplitude of the readback signal has been reduced by a predetermined amount. The determination is preferably made on a sector-by-sector basis in a two-step process. First, the signal amplitude of each burst is compared with a corresponding normalization value measured in the same circumferential position of the last written track to obtain a propagation burst fractional amplitude. This current value is then compared to a reference value for the sector, and the difference is used as a position error signal (PES) for making corrections to the head position. The PES is also stored for later use. The normalization values are updated for each newly written track in a normalization revolution. Updating for every track has been performed previously because the propagation burst amplitudes from track to track which provide the normalization values tend to vary due, e.g., to fly height variation and modulation of the magnetic properties of the disk or other causes. New reference values are also calculated for each track during the normalization revolution and incorporate the stored PES values and have the effect of reducing track shape error growth. Preferably, the new reference values each comprise a nominal reference value plus a corrective value calculated from the previously stored PES for each sector. In addition, the servo loop is designed to have a closed loop response which causes track shape errors to decay, rather than grow, from one track to the next. A drawback of the proposed scheme is that track-to-track updating of the normalization and reference values adds time to the servowriting process.

Accordingly, what is needed is a self-servowriting disk file which the preceding problems of accuracy associated with self-servowriting while providing acceptable servowriting performance.

SUMMARY OF THE INVENTION

It is the principal object of this invention to provide an accurate and time-efficient method and system for self-servowriting wherein at least one reference value used to position the transducer is updated for some, but not all, of the tracks to be written. The reference value(s) are, for example, the normalization-values, the "f" reference values, or the components used to determine the "f" reference values, namely the nominal average reference values or the corrective values to the nominal average reference value. The reference value(s) are dependent upon at least one predefined indicium of transducer position, such as the amplitude of the normalized readback signal obtained from a written track when the transducer is positioned on the track. In a first embodiment, updating of the reference value(s) is performed at every Nth track written, where N is a fixed number or range of numbers determined by an expected track-to-track variation of the indicium. The servowriting system may be designed to dynamically increase or decrease N during servowriting in response to actual variations in the indicium. According to a second embodiment, updating is only performed when needed, e.g. when the variation of the measured indicium between two written tracks (not necessarily adjacent tracks) exceeds a predefined threshold value. For systems employing dual-element heads, servowriting accuracy is enhanced by performing a read head adjustment prior to updating of the reference values.

DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

Disclosed herein are improvements to a self-servowriting apparatus and method such as that described in U.S. Patent application Ser. Nos. 08/349,028 and 08/405,261. Accordingly, the underlying inventions of those applications will be described to set the stage for the proposed modifications.

I. Self-Servowriting Disk Drives

Figure 1:
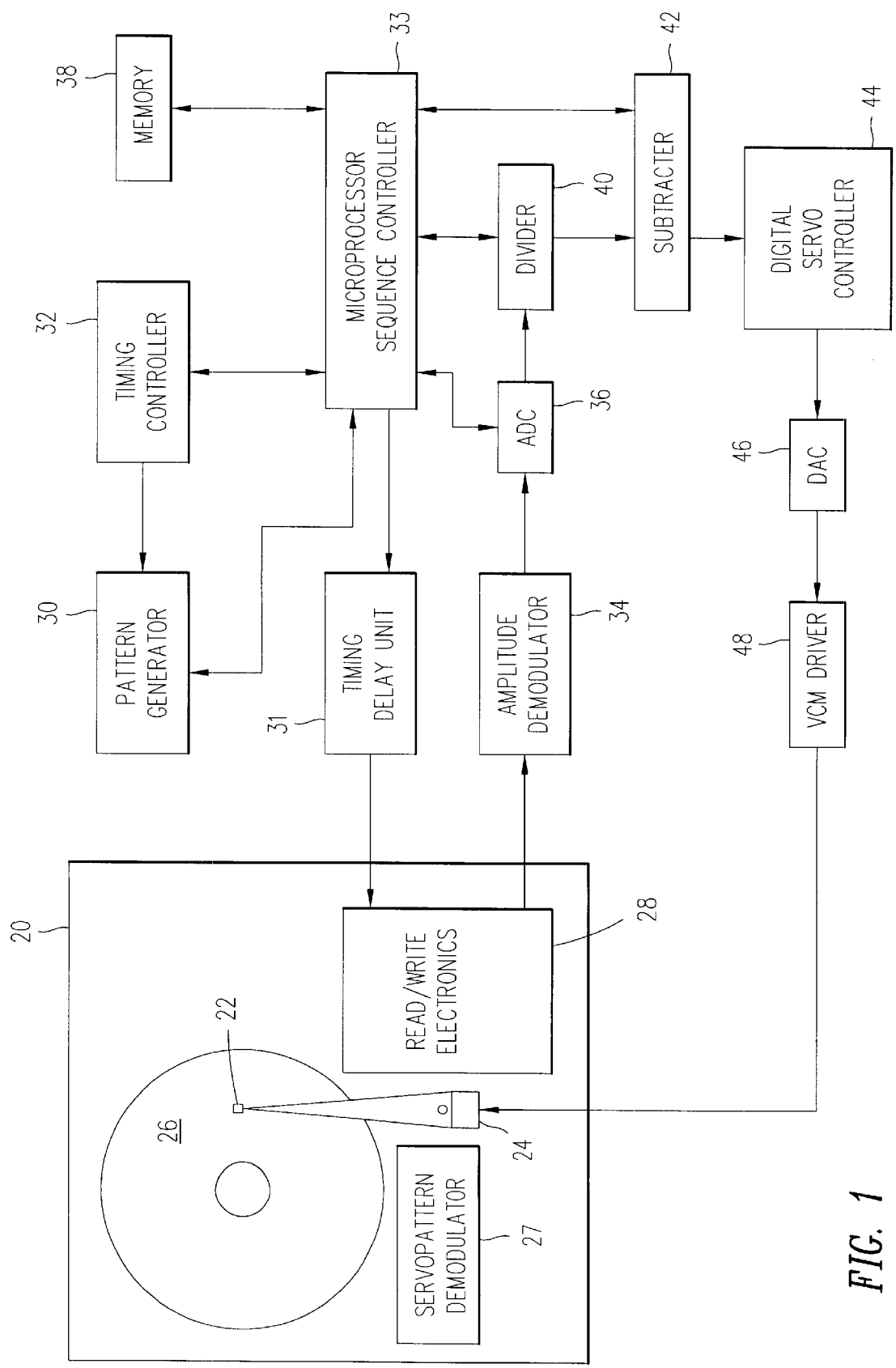
FIG. 1 is a block diagram of a self-servowriting system suitable for practicing the present invention.

FIG. 1 provides the major components of the preferred self-propagating disk drive servo-writing system for practicing the present invention. A disk drive 20 comprises a recording transducer 22, voice coil actuator 24, recording medium 26, servopattern demodulator 27, and read/write control electronics 28. The normal operating functions of these elements are well understood in the disk drive industry. The disk drive 20 is connected to a time delay unit 31 in series with a pattern generator 30, which is clocked by a timing controller 32. The timing controller 32, under the direction of a microprocessor sequence controller 33, allows bursts of magnetic transitions to be recorded at precisely controlled times. For the purposes of radial self-propagation burst writing and detection, the timing controller comprises, for example, the AM9513A system timing controller manufactured by Advanced Micro Devices Corporation of Sunnyvale, Calif., which is simply synchronized to a once per revolution index timing mark. It shall be understood, however, that the writing of actual product servopatterns requires much tighter timing control, particularly when writing the servo identification fields and whenever writing phase encoded servo patterns. Methods for achieving such precise timing control using the internal disk file recording transducer, in a manner consistent with self-propagation are described in U.S. Pat. No. 5,485,322 and are expressly incorporated herein by reference.

A readback signal from the read/write electronics 28 is provided to an amplitude demodulator circuit 34,.and its. amplitude is converted to a digital value by an analog-to-digital converter (ADC) 36 at times determined by timing controller 32 acting in concert with the sequence controller 33 (e.g. when the head is passing over a burst pattern on the disk). The digitized output of ADC 36 is provided to a divider 40. The divider 40 divides the signal by a digitized normalization value stored in memory 38. The output. of divider 42 is provided to a subtractor 40, which subtracts the digital input value from a reference value retrieved from memory 38 to create the position error signal (PES). These functions are described in greater detail subsequently.

The PES is provided to a digital servo controller 44 which converts it into an appropriate corrective control signal. The corrective signal is then converted to analog form by a digital to analog converter (DAC) 46, and is further amplified and converted to a current by a VCM driver 48. The first driver current is applied to voice coil actuator 24 in the disk file causing recording transducer 22 to move approximately radially with respect to recording medium 26.

Sequence controller 33 provides computation capabilities for general use in determining modifications to the stored reference table values, for determining appropriate delay settings to be applied to timing delay unit 31, and for producing control signals for pattern generator 30. Preferably, the functions of divider 40, subtractor 42, and digital servo controller 44 are all achieved through the appropriate programming of sequence controller 33.

Figure 2:
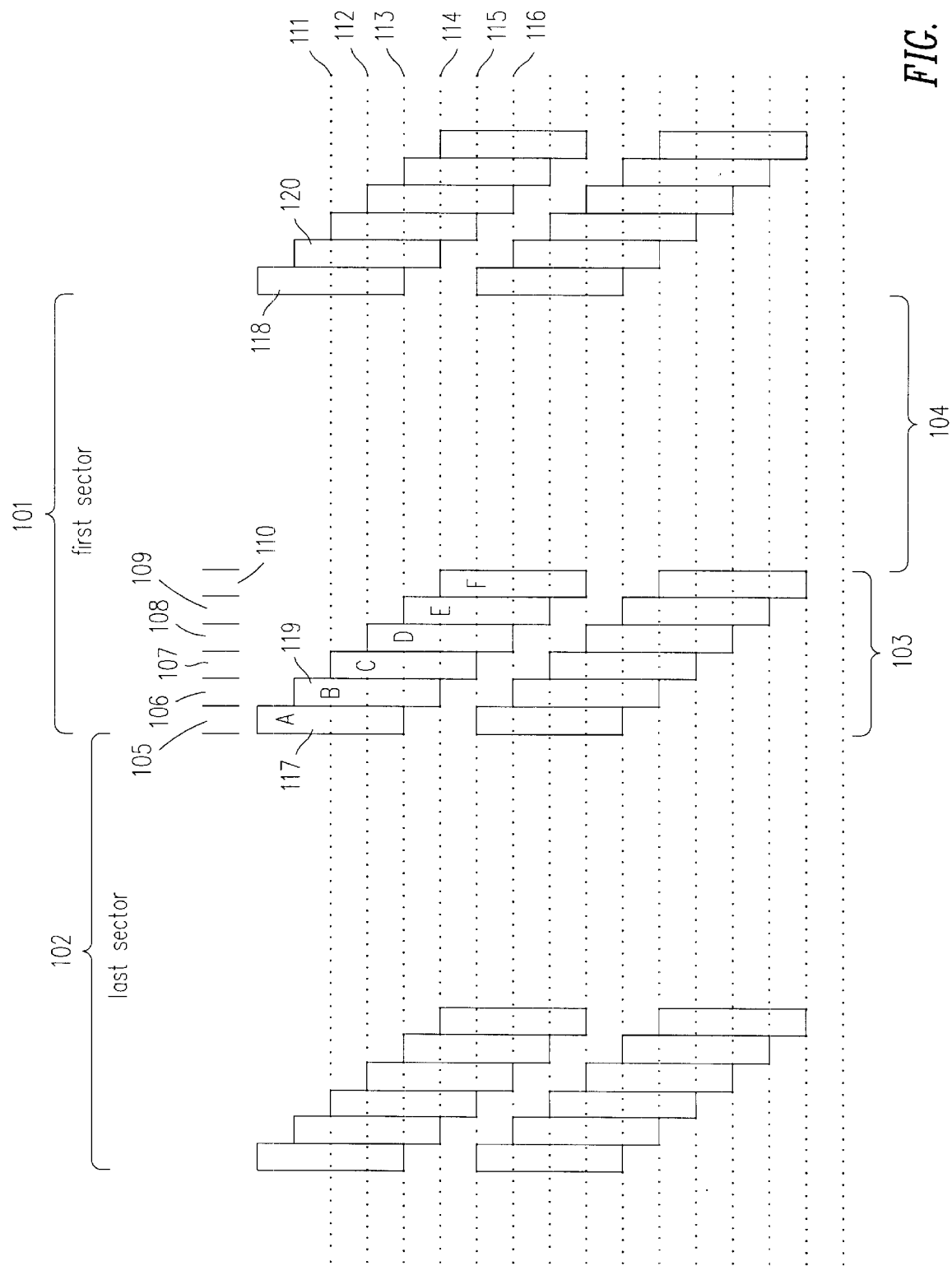
FIG. 2 is a diagram illustrating the relationship between propagation tracks, disk sectors and propagation bursts in a self-servowriting system suitable for practicing the present invention.

FIG. 2 shows a diagram of a portion of recording medium 26 including a number of propagation tracks represented by dotted lines 111, 112, 113, etc. Each track comprises a number of sectors, with a first sector 101 typically coming immediately after the disk rotation index as determined, for example, by an index pulse from the disk spindle motor driver or from the timing controller. Each sector is further divided into two regions: a first region 103 containing bursts comprising, for example, a recognizable series of magnetic transitions, and a second region 104. The propagation bursts define propagation tracks for use in accurately positioning the head to write product servopatterns. Region 104 is reserved for use by the precision timing propagation system and for actual product servopattern, which includes, for example, sector ID fields and a pattern such as an amplitude burst or phase encoded pattern. Preferably, propagation burst areas 103 will be overwritten with user data after servowriting. All of region 104 except for the part containing the product servopattern will also be overwritten with user data.

Each propagation burst region 103 is further divided into a number of slots 105–110 within which propagation bursts (A,B,C,D,E, and F) are written. The propagation track pitch in FIG. 2 is preferably one-quarter of the assigned data track pitch. That is, if the first user data track is centered on propagation track 112, the next data track will be centered on propagation track 116 providing a ¼ track separation between the propagation tracks 113 and 114, and so on across the disk. The preferred propagation burst pattern consists of a repeating sequence of 6 bursts as shown in FIG. 2. This is useful because the bursts, which are nonoverlapping in the radial direction, allow the recording transducer to radially back up and check previously written bursts.

A typical number of sectors is 120 and a typical disk rotation rate is 5400 rpm, translating into about 92 microseconds per sector. A typical slot time, i.e., the duration of time for the slot to pass a fixed point of reference in the circumferential direction, is 7 microseconds. The slot time is preferably longer than the duration of a product servopattern burst, since longer bursts extend filtering time during demodulation. More filtering time results in a higher signal to noise ratio, which simplifies some of the digital servo loop computation, particularly with regard to determining derivative or velocity related servo terms. Moreover, there is no loss of user data space with expanded propagation bursts since they will be overwritten later. However, it will be understood that shorter burst times may be used if more time is needed for timing marks and product servopattern writing to regions 104.

Figure 3A:
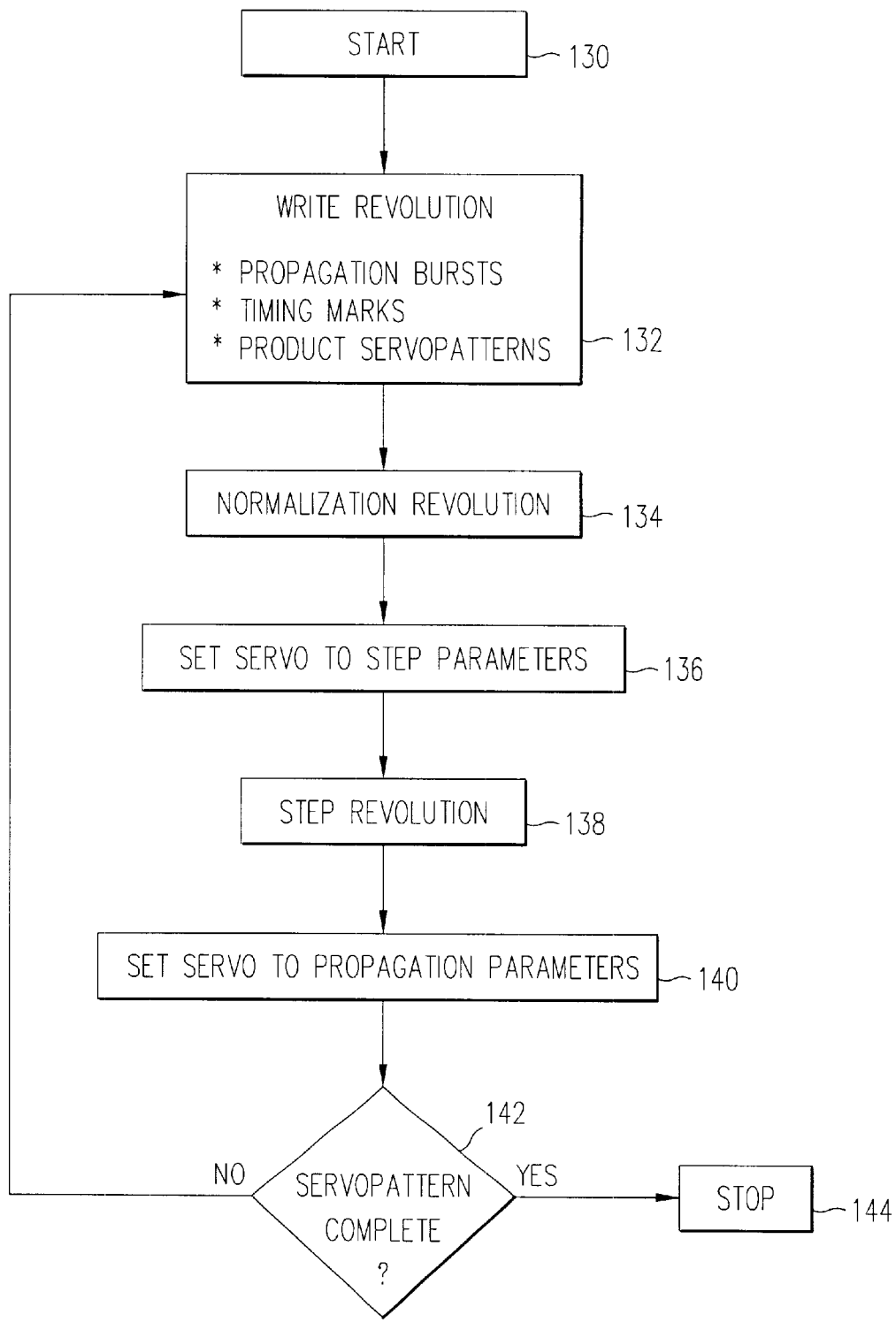
FIG. 3A is a flow diagram of the basic process steps for a self-servowriting system suitable for practicing the present invention.

Referring now to FIG. 3A, an iterative self-propagation process is shown. In a first step 130, the recording transducer is located at either the outermost accessible track (OD) or innermost accessible track (ID) of the disk file with the actuator being pushed against a physical stop to lock it against mechanical disturbances. In a next step 132, a first propagation track 111 (FIG. 2) is written with A bursts in the first slot of each propagation burst region. Also, the first portion of the product servopattern is written within region 104 of each sector together with the precision timing marks. These preferably occupy only a small portion at the beginning of region 104 on the same surface as the propagation burst patterns and are written during the same revolution of the disk. If other recording surfaces are to be written within a stack of disks, these are preferably written next with product servopatterns (but not timing marks) in successive disk rotations by switching the write electronics to select each recording transducer in turn. The first revolution, or series of revolutions for multiple disks, is referred to as a write revolution.

The next revolution of the disk, important to an understanding of the present invention, is referred to as a normalization revolution and is indicated as step 134 in FIG. 3A. In this step, the head is in read mode and sequence controller 33 signals the ADC 36 to sample and digitize the demodulated readback signal during the first slot of each sector, i.e., the "A burst". These digital sample values are stored in a propagation burst amplitude normalization table in memory 38. (See table 360 in FIG. 3B).

After all sectors have been read in the normalization revolution but before the first propagation burst region 103 of the next revolution, parameters used in the servo control voltage calculation are set equal to predetermined values ("step parameters") that provide rapid motion and settling. This is shown as step 136 in FIG. 3A. As an example, servo parameters similar to those used in the operation of the disk file would work well as step parameters.

Figure 3B:
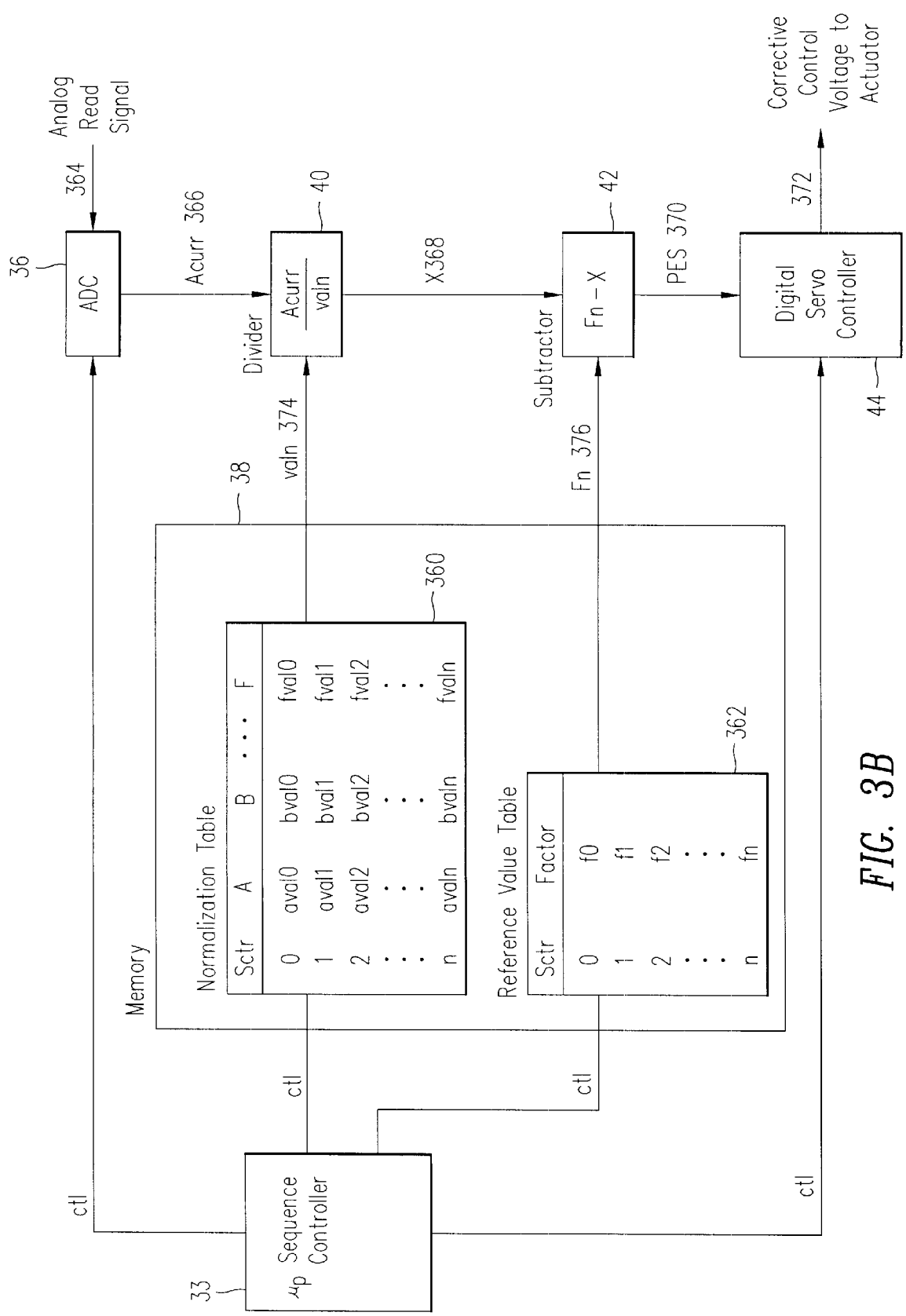
FIG. 3B is a block diagram illustrating the elements of the self-servowriting system involved in generation of a position error signal during step propagation.

The next revolution of the disk is referred to as a "step revolution" and is shown as step 138. Some of the key servowriting elements involved in the execution of this step are shown in FIG. 3B. Referring to both FIGS. 3A and 3B, at the beginning of the step revolution 138, memory 38 contains not only the normalization table 360, but also a preloaded reference value table 362 holding a list of "f" reference values, f0–fn, for each of the sectors, 0–n. Initially, the "f" reference values are all assigned to a same value representative of the anticipated amplitude reduction of the normalized readback amplitude if sensed from the next propagation track 112. For subsequently written tracks, the "f" reference values are calculated from nominal average reference values plus corrective values appropriate for the current track. These calculations are described in further detail subsequently. During the step revolution 138, sequence controller 33 steps through the normalization table 360 and the "f" reference value table 362 sector by sector, routing an appropriate normalization value, valn 374, to the divider 40 and a corresponding reduction factor, Fn 376, to subtractor 42. During the first iteration of the servowriting sequence, the set of normalization values obtained from the A bursts, ava10-avaln, will be used. Concurrently, ADC 36 continues to digitize the readback signal 364 from the A bursts under the sequence controller's 33 direction, producing readback signal Acurr 366 having an amplitude of some magnitude. The divider 40 receives Acurr 366, divides it by the normalization value, vain 374, and provides the result, a propagation burst fractional amplitude X 368, to subtractor 42. The subtractor 42, in turn, receives X 368, and subtracts it from the "f" reference value, Fn 376. The result provides a position error signal, PES 370, which will be available at the subtractor 42 output when recording transducer 22 reaches the end of each propagation burst region 103. At this time, sequence controller 33 signals digital servo controller 44 to read the PES 370 and to compute a new control voltage setting. The control voltage 372, adjusted after each sector, drives actuator 24 in a direction that reduces the PES 370, i.e., toward propagation track 112.

The actuator 24 typically settles onto the next propagation track 112 in about one quarter of a disk revolution. At that time, in a next step 140 of FIG. 3A, the parameters of the servo control voltage calculation are assigned a different set of parameters, i.e. "propagation parameters". The propagation parameters are tailored to provide rejection of mechanical disturbances without amplification of track shape errors. The manner in which they are determined will be described subsequently. Even though the step to the next propagation track takes less than a full revolution, it simplifies matters to allow the revolution to complete before writing the next set of bursts.

At this point only a single propagation track has been written so the result of a decision step 142 comparing the number of data tracks written with the total number of tracks to be written is necessarily negative and the process returns to write revolution step 132. In this second write revolution, the sequence controller 33 signals pattern generator 30 to write bursts of transitions, B, in the second slot of each sector. As before, precision timing marks and product servopattern are written in regions 104 on the same recording surface, and only product servopattern on the remaining recording surfaces. Throughout this write revolution, ADC 36 continues to digitize the A bursts and servo controller 44 maintains actuator 24 in a position such that transducer 22 stays close to the desired location of track 112. The PES values obtained during this write revolution are recorded in a table in memory 38 for later use in providing corrective values for calculating new "f" reference values.

The next revolution is again a normalization revolution, step 134. In this iteration, the ADC 36 digitizes both the A & B burst amplitudes, storing the B burst amplitudes in the normalization table 360. Meanwhile, the servo loop continues to track follow using PES values computed from the A burst amplitudes, the stored A burst normalization values, and the stored reference values. Preferably, new reference values are also computed during this revolution. Each new table value is set equal to a nominal average reference value determined previously to be appropriate for the desired average track spacing in this region of the disk, plus a correction value appropriate for the current track and obtained from the stored PES values. The correction value may comprise, for example, a predetermined fraction of the previously stored PES value for the corresponding sector obtained during the preceding write operation. Alternatively, it is computed using a digital filtering algorithm which is dependent on the closed loop transfer function of the servo loop, as described in the referenced co-pending applications. The algorithm is applied to the entire set of PES values stored during the preceding write revolution. Preferably, corrective value calculations are initiated during the write revolution 132 and completed sector by sector during the step revolution 138, updating the reference value table just prior to computation of the control voltage.

It shall be understood that the term "reference value" in it the appended claim is intended to refer to any of the normalization values, "f" reference values, nominal average reference values, or corrective values, as well as to any other indicia of transducer position as will become apparent to the reader from the teachings of the present specification.

Switching now to the B bursts for PES computations, the process repeats, i.e., another step revolution is executed (step 138) wherein transducer 22 steps to the next propagation track, followed by a write revolution, step 132, in which C bursts, timing marks and product servopatterns are written. This continues (with A bursts following F bursts) until the desired number of data tracks have been written, resulting in a yes answer at decision step 142 and terminating the process at step 144.

Figure 4A:
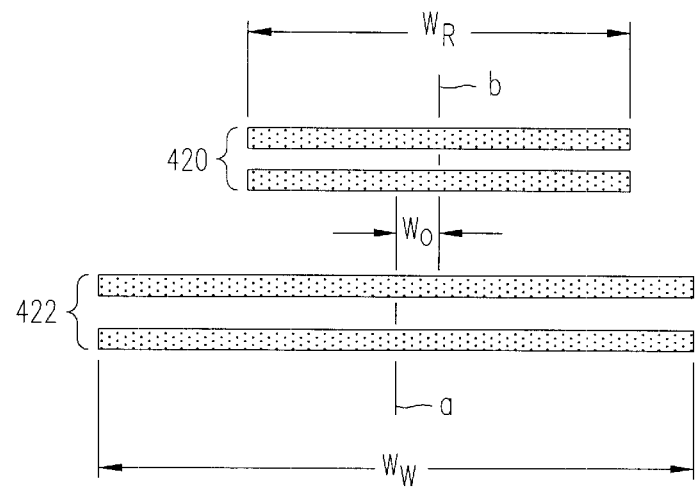
FIG. 4A shows the relative offsets of the read and write elements in a dual element head suitable for practicing the present invention.
Figure 4B:
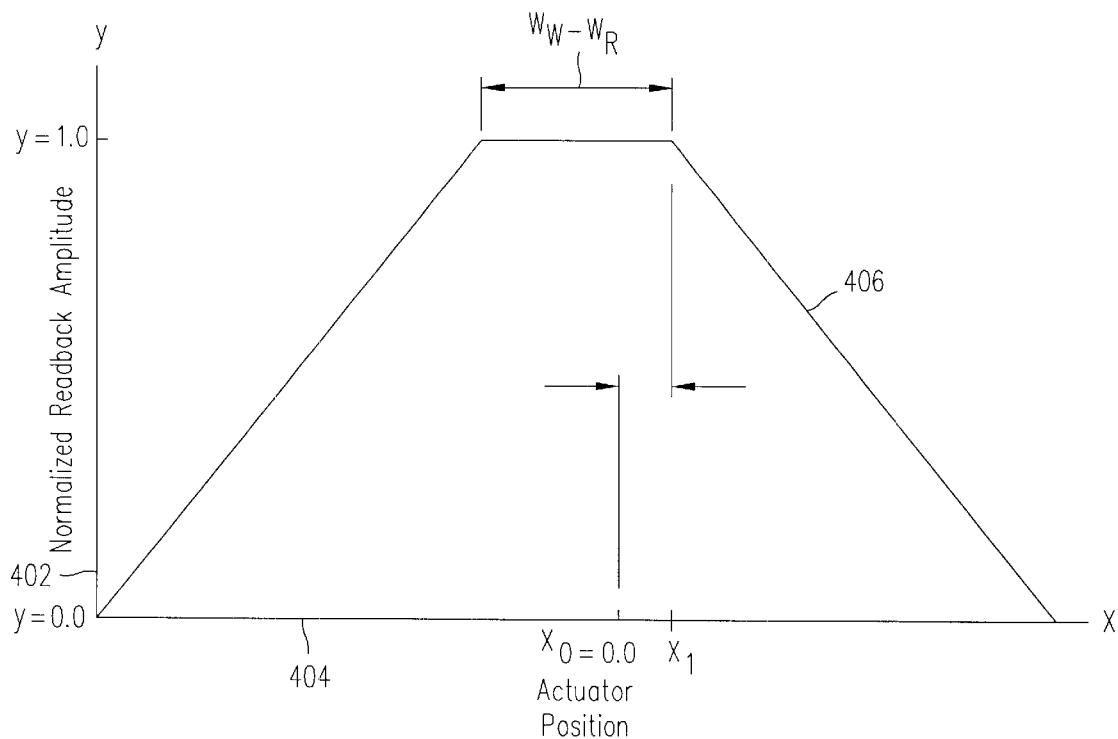
FIG. 4B is a graph illustrating a variation in readback signal amplitude as the actuator changes position across the disk in a self-servowriting system suitable for practicing the present invention.

In the discussion so far, it has been assumed that the recording read transducer and write transducer are one and the same, as in the typical inductive read/write element commonly used. Relatively recently, however, "dual element" transducers employing separate read and write elements such as magneto-resistive (MR) transducers have come into use, and require special attention with regard to the determination and control of propagation track spacing by means of nominal average reference value settings. FIG. 4A is a representation of an MR transducer wherein the read and write elements, 420, 422 have different widths, Wr and Ww, respectively, and a relative offset, Wo, between their respective central axes, a and b. FIG. 4B graphically represents a variation in the normalized readback amplitude from the read element 420, and the effect of the head offsets. Readback amplitude is indicated along the y-axis 402, with change in the position of the actuator indicated by the x-axis 404. The actuator position Xo=0.0 corresponds to the actuator position during a write operation. The flat portion of curve 406 represents the range of actuator movement in which the read element is radially aligned inside the written pattern to produce the best readback signal, and is equal to Ww-Wr as indicated.

As should be apparent from FIGS. 4A and 4B, the actuator movement required to reach a particular level of amplitude reduction depends on read element width, write element width, relative offset, and direction of motion. It is desirable, however, that the propagation track spacing be determined only by the read and write element widths, and not by head offset, since the apparent offset of the heads in a rotary actuator disk drive changes as the actuator sweeps from the outermost to the innermost track in a disk file. That is, the spatial separation of the read and write elements along the actuator arm direction leads to different projected locations of the read and write elements along the arc defined by the actuator arm motion. Dependency on read to write element offset may be eliminated in a manner which requires no prior knowledge of the precise geometry of the head and which can be achieved solely through measurements of readback amplitudes, as described in co-pending application serial no. 08/405,261. But for completeness, this approach will be described next with reference to FIG. 5.

Figure 5:
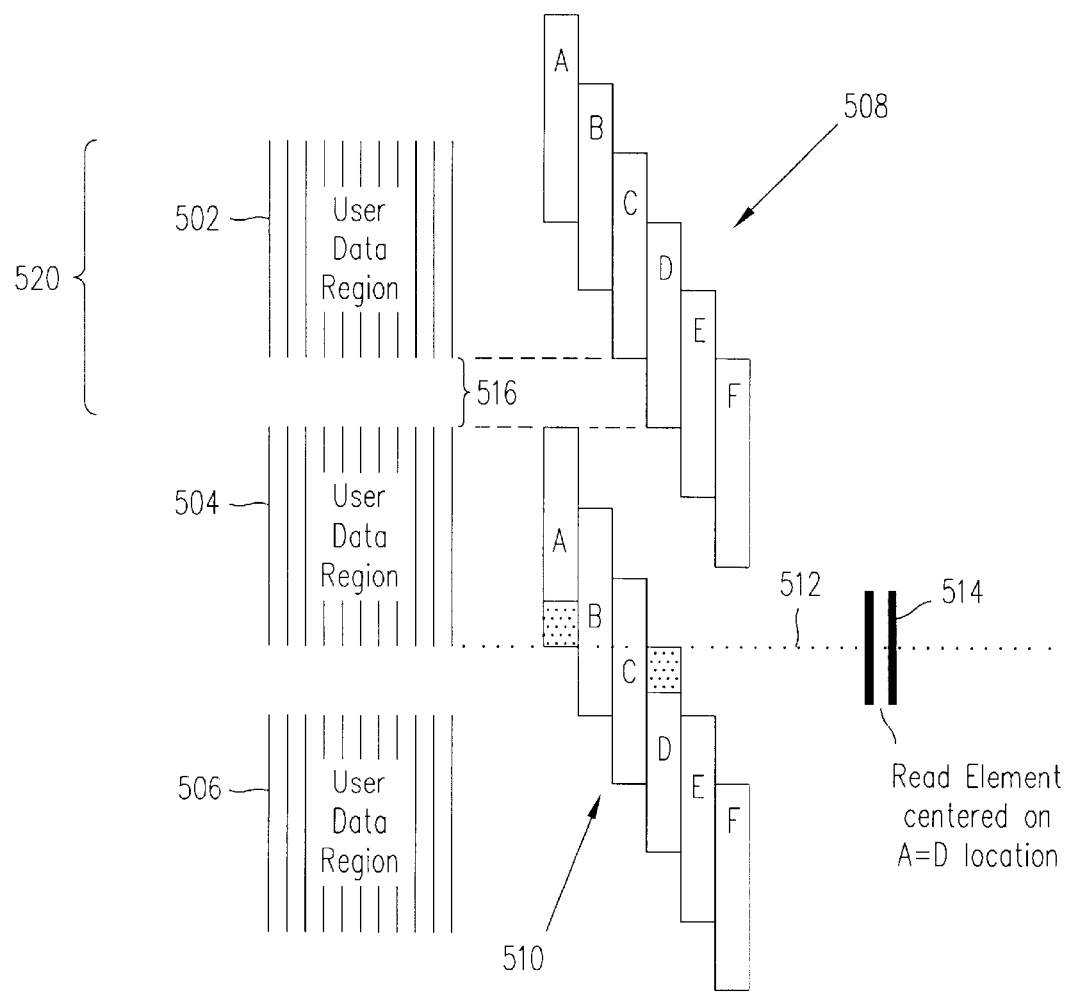
FIG. 5 illustrates the relative locations of the bursts in a six-burst propagation pattern suitable for practicing the present invention.

FIG. 5 illustrates the manner in which a six burst propagation burst region is used to write data tracks during self-servowriting. Each propagation burst (A-F) is radially displaced from an. adjacent burst by a step comprising ¼ of the desired data track pitch. Track pitch 520 comprises the write element width (which determines the width of the data track) plus the desired radial distance or separation 516 between adjacent data tracks 502, 504. The radial track separation 516 should be sufficient to prevent accidental overwrite of adjacent tracks during a track write operation, as previously discussed. Since the bursts are radially spaced by ¼ of the desired track pitch, the write head is first aligned with burst A when writing data track 504. Next, the write head is aligned with a burst four steps or propagation tracks away, which in this case is burst E, when writing the next data track 506.

Pairs of burst patterns that are radially separated from one another by three ¼ track steps line up along a common edge.

For example, propagation bursts A and D share a common edge along dotted line 512. Burst patterns 508, 510 are relatively positioned to preserve this relationship. For example, burst D of pattern 508 and burst A of pattern 510 are also radially aligned along a common edge.

If the read element 514 is positioned with respect to burst pattern 510 so that the normalized readback amplitude from burst A equals the normalized readback amplitude from burst D (the A=D position) then the relative normalized signal is 0.5 if the edges line up, greater than 0.5 if the edges overlap, and less than 0.5 if the edges have space between. Thus, the relative normalized signal at the A=D position may be used as an indicator of whether the propagation track pitch is too small or too large, and track pitch can be corrected by using this relative normalized signal to adjust the nominal average reference value used to calculate reference values during propagation. If normalized readback amplitude varies linearly with position (a fairly good approximation, as shown in FIG. 4B), the adjustment in the nominal average reference value can be computed from the measured relative normalized signal at the A=D position.

The relationship may be better understood by noting that a change in nominal average reference value by an amount r results in a change in the relative normalized signal at the A=D position of 3r/2, since each of the three steps, A to B, B to C, and C to D, contributes a spacing change equal to r, and these changes are shared equally by A and D. The nominal average reference level should therefore be adjusted by an amount equal to $2/3$ of the deviation of the relative normalized signal at the A=D position from its desired level.

Disturbances experienced by the described self-propagating servo system may cause the actuator to deviate from the ideal propagation track. These occurrences are referred to as track misregistration (TMR) and will result in mispositioned write bursts. Subsequent readback of mispositioned bursts in the next propagation cycle results in an offset or "modulated" position signal.

Figure 6A:
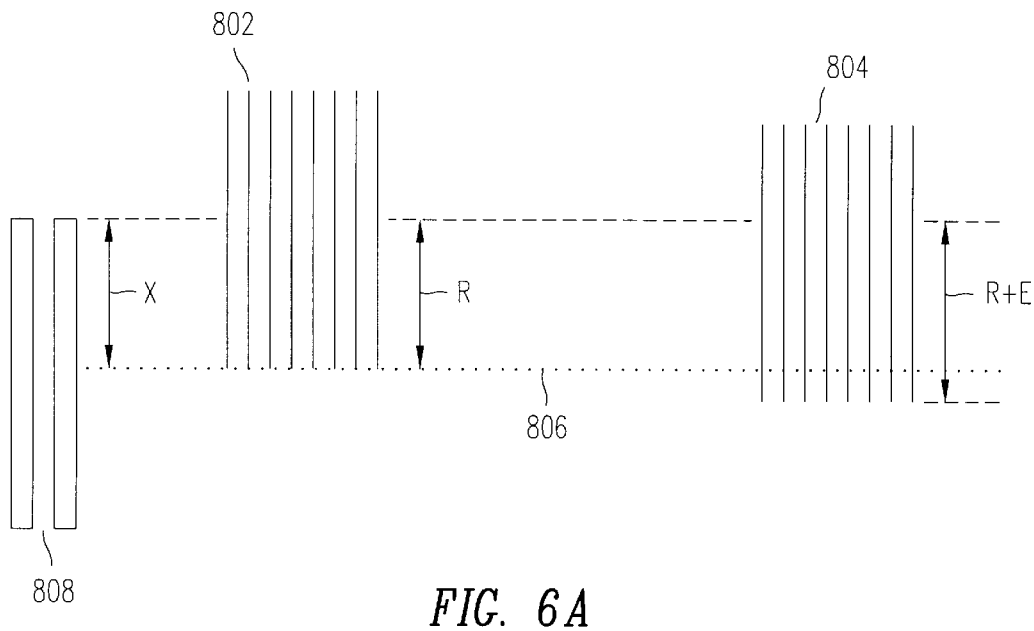
FIG. 6A is an illustration of a properly positioned product servopattern burst versus a radially offset burst.

FIG. 6A illustrates a properly positioned burst 802 and a mis-positioned burst 804 resulting from TMR. When centered on the desired propagation track a distance X from the preceding propagation track, the recording transducer 808 reads back a normalized readback amplitude R for the properly positioned burst 802. Since this is the desired location, this normalized readback amplitude equals the reference track value, resulting in zero PES. However, the mis-positioned burst 804, having its edge shifted an amount E from the desired propagation track location 806 relative to the width of the transducer 808, results in a relative readback signal of R+E.

Figure 6B:
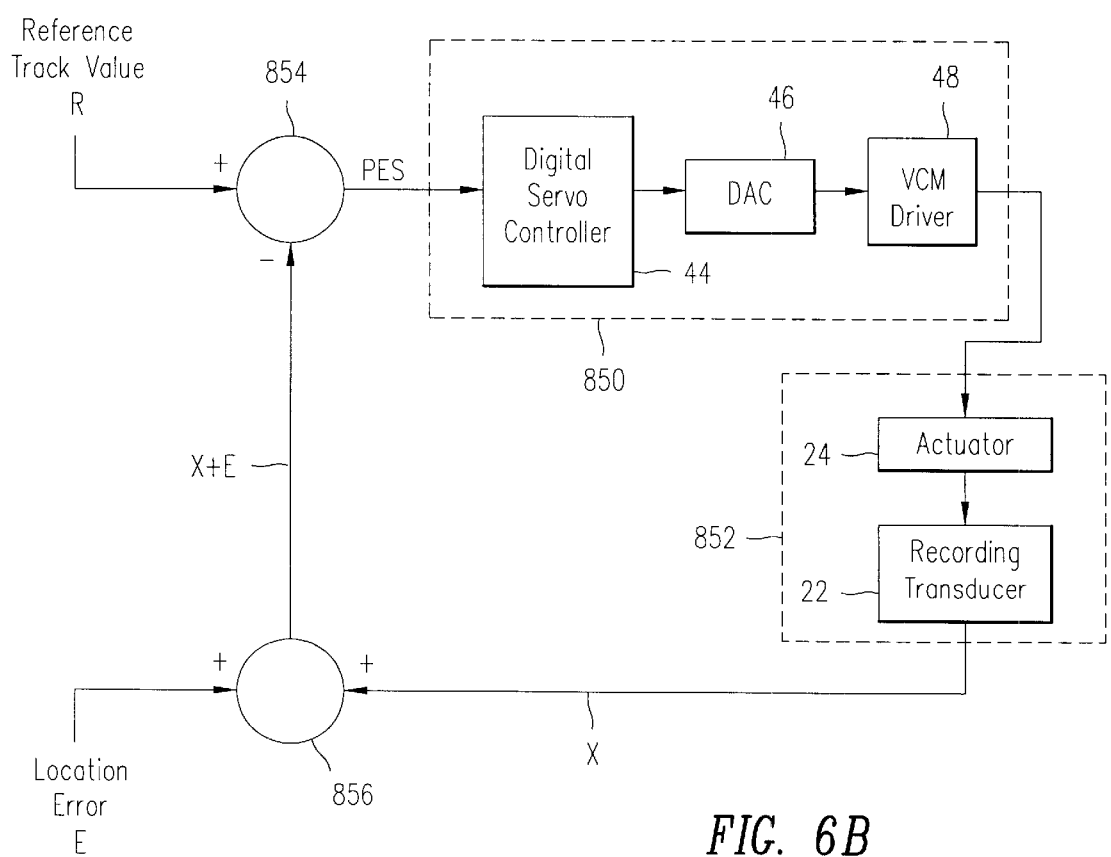
FIG. 6B is a control system diagram of a servo loop showing the manner in which the readback signals from the bursts in FIG. 6A are combined with a location error to form a position error signal suitable for practicing the present invention.

Referring now to FIG. 6B, a block diagram is shown of a servo control loop suitable for implementing the improved self-servowriting system of the present invention. Control systems are described generally in the book "Modern Control Engineering" by K. Ogata published by Prentiss-Hall corporation of Englewood Cliffs N.J. The loop controller 850 comprises digital servo controller 44, DAC 46, and VCM driver 48. The "plant" 852 comprises actuator 24 and recording transducer 22. The plant output X represents the absolute position of the recording transducer in units of relative head width. During self-propagation, the only observable signal is the position of transducer 22 relative to recording medium 26, but it is useful to consider the absolute position X for the purposes of analysis of servo loop performance. A loop summing point 856 is explicitly included to account for the relative nature of the observed position signal. Thus the observed position signal equals the sum of the absolute position X and the burst position error E. This signal X+E is combined at a standard loop reference summing point 854 with the reference track value R to form the position error signal or PES. In usual fashion the sign shown next to the incoming arrows at a summing point represents a sign factor to apply to each signal before summing, hence the PES equals R−(X+E).

II. Enhanced Normalization Sequence

The proposed improvements to the self-propagating process just described are modifications to normalization step 134 of FIG. 3A. In FIG. 3A, normalization is performed on every iteration of the servowrite process to assure accurate placement of the transducer for writing of the servo bursts. Normalization occurs after the write revolution, but prior to moving the transducer away from the written track, and is used to update the normalization values. The normalization values are dependent upon some indicium of transducer position such as the amplitude of the readback signal obtained from the track just written. In the proposed self-servowriting system, the normalization revolution is not required for every track if the indicium of transducer position is determined to be slowly varying from track to track. Rather, normalization is scheduled to occur at fixed intervals, e.g. every Nth iteration of the servowrite process, or on an as-needed basis. Additionally, it involves an interruption of propagation and direction reversal of the head, as will be described momentarily.

Figure 3C:
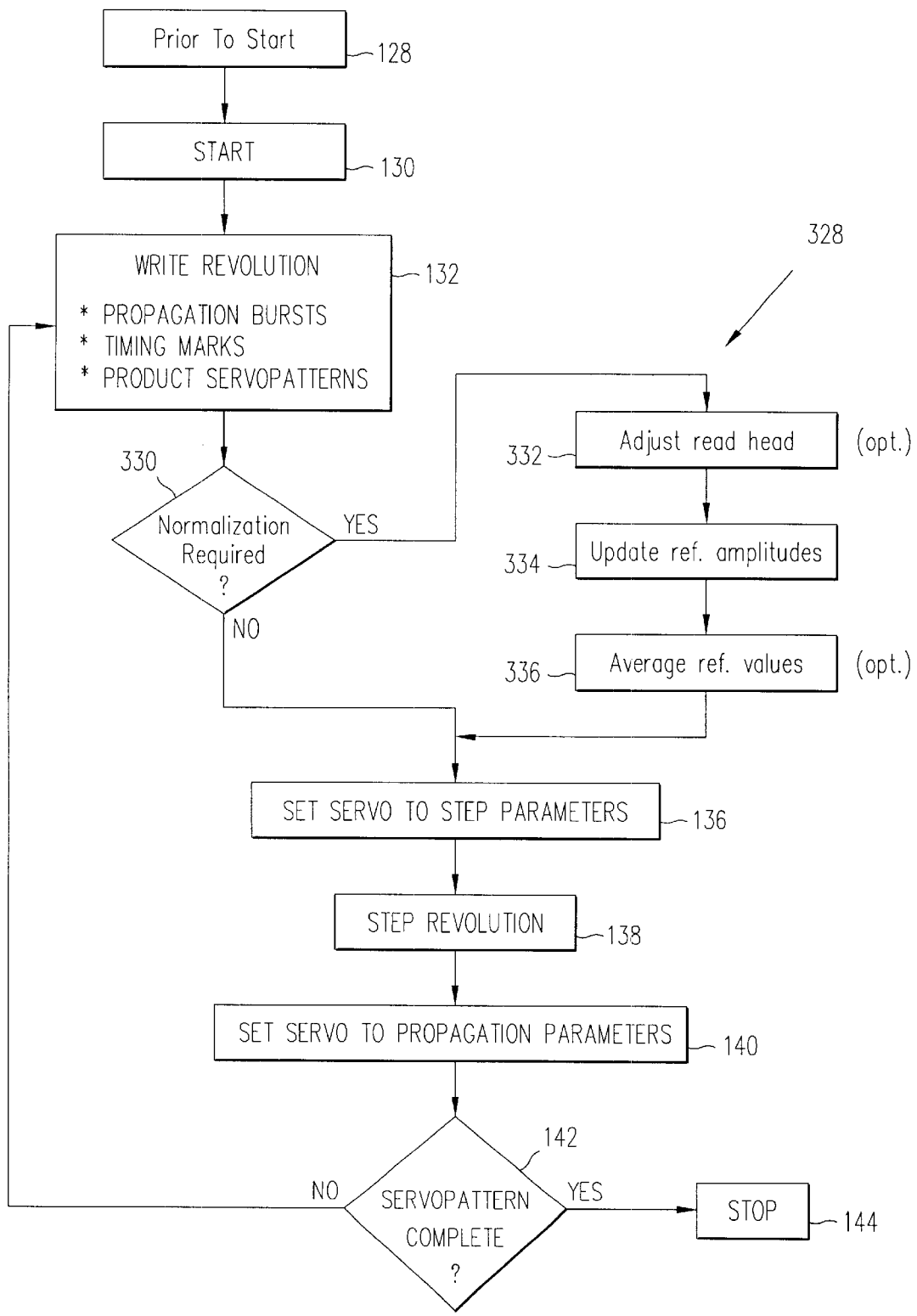
FIG. 3C is a flow diagram for a self-servowriting system incorporating the improvements of the present invention.

The control flow of the normalization sequence for a slowly varying system according to the present invention is shown in FIG. 3C. As indicated by loop 328, the normalization step now comprises a decision step 330, so that normalization is performed at some, but not all, of the tracks written. In this manner servowriting time is significantly reduced with minimal impact, on accuracy.

The first embodiment applies best to disk drives where track to track variation in the indicium is already known or is easily determined, and is slowly varying across the disk. Indicium measurements are scheduled to occur every Nth propagation track to maintain acceptable accuracy. N, is a predetermined fixed number or range of numbers, N, determined by balancing servowriting accuracy with reduced servowriting time. During experimentation, the applicants found that for a particular family of disk drives a fixed value of N=40 was satisfactory. N may be adaptively increased or decreased based upon actual variation in the indicium across the tracks. For example, N is initially set to a default value such as 40, and is then increased or decreased based upon the actual measured variation between two tracks, which need not be adjacent tracks. For example, the measurements may be made at each "A burst" track. N is increased if the observed variation falls below a predetermined threshold value, and decreased if it rises above the same or another predetermined threshold value.

In circumstances where the normalization variation is unknown or erratic, it is more appropriate to use the second embodiment wherein the frequency of updating is determined by comparing a measured indicium value from a previously written track with the measured indicium at the current track at decision step 330, and entering the normalization sequence only if the difference in measured indicium values exceeds a threshold value. Again, the tracks at which these preliminary measurements are made need not be adjacent tracks.

The normalization process is optionally further enhanced by averaging the normalization values of like sectors obtained from one normalization revolution to the next, as indicated by step 336 in FIG. 3C. The averaged sector normalization values are then used in lieu of the actual normalization values for improved signal to noise ratio.

In a similar manner, the "f" reference values need only be recalculated every Nth step if found to be slowly varying in value from track to track. Alternatively or additionally, the nominal average reference values and/or corrective values used to calculate new "f" reference values, if determined to be slowly varying, may be updated every Nth step. From this discussion it follows that other indicia of transducer position, if found to be slowly varying from track to track, may be updated less frequently for enhanced servowriting performance without appreciable effect upon servowriting accuracy.

Regarding the case of reduced normalization revolutions, a further improvement is proposed for self-servowriting systems employing dual element heads. As indicated by step 332 of FIG. 3C, a corrective adjustment for head offset is added to the normalization sequence.

Figure 7:
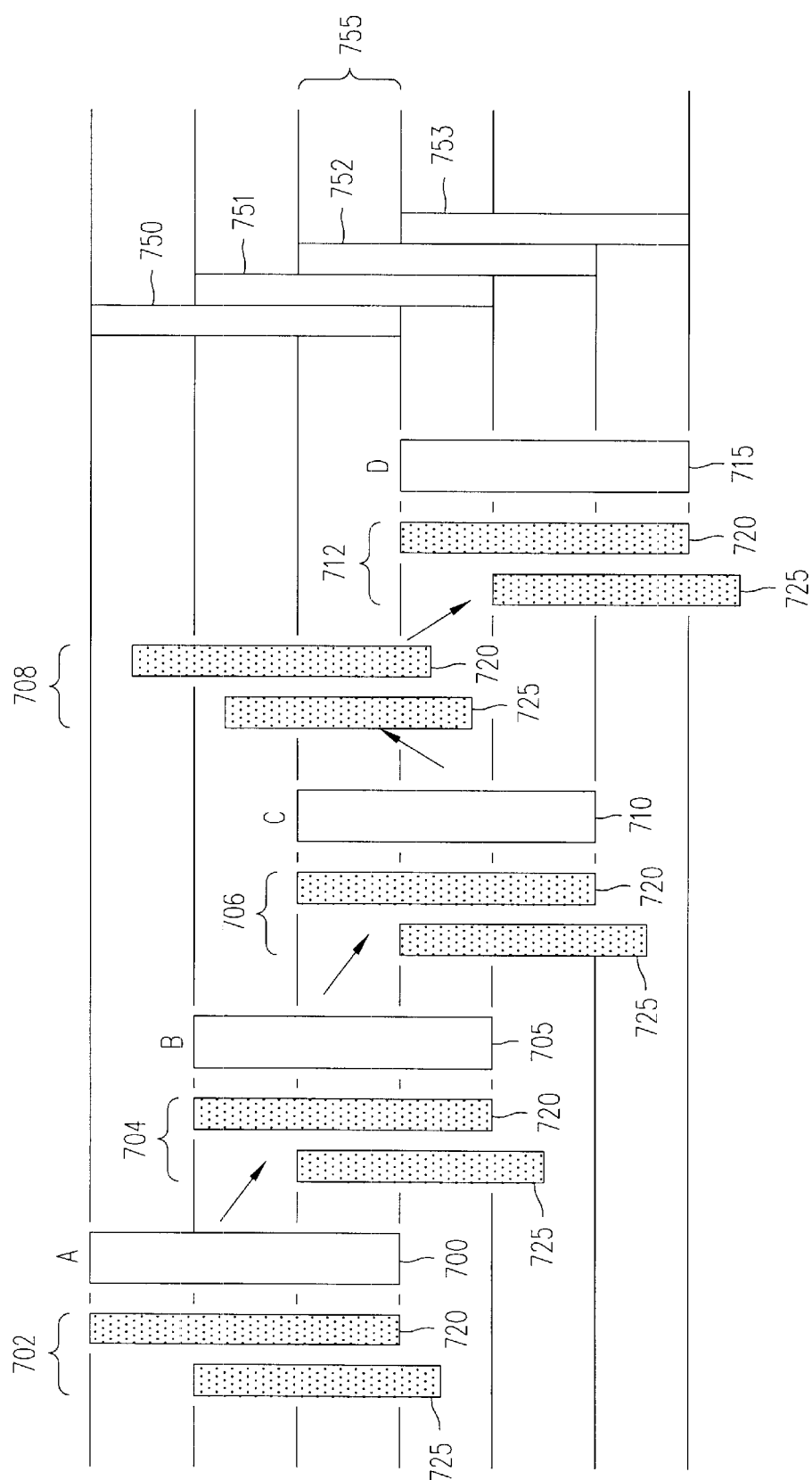
FIG. 7 illustrates relative head positions in a dual element head during a normalization revolution according to the present invention.

FIG. 7 illustrates the problems introduced in the normalization step when using a dual-element head, and facilitates an understanding of the proposed normalization sequence incorporating a read element adjustment. The dual element head comprises a write element 720 and a read element 725, and is shown at various radial positions indicated by numerals 702, 704, 706, 708 and 712. First, the head is moved to the OD (or ID), position 702, where write element 720 writes a plurality of propagation bursts A 700 and corresponding product servo patterns 750. If a normalization revolution is to be executed for this track, the A burst normalization values would simply be obtained by reading each A burst 700 at the current head position and storing it in the normalization table 360. In the case of a single-element head, read/write is aligned with the A bursts 700 at this point, and the readback signal has a maximum readback signal amplitude. However, from FIG. 7 it is readily apparent that at head position 720, the read element 725 is not aligned with the A bursts 700 due to its offset from write element 725. Consequently, a less than ideal on-track normalization reading of the A burst is obtained.

Under the proposed scheme, normalization is inhibited during writing of at least the first two propagation tracks. Upon completion of writing the A bursts 700, head moves away from the OD while read element 725 reads A bursts 700 until the head is positioned so that the readback amplitude has been reduced by a predetermined amount (position 704). While maintaining the current head position 704, the write element 720 writes a plurality of B bursts 705 and corresponding product servo patterns 751. Thereafter, the head again moves in a direction away from the OD. as the read element servos on the A and B bursts 700, 705 until the head reaches position 706. At this position 706, the write element 720 writes a track of C bursts 710 and servo patterns 752.

At this point, if a normalization revolution is scheduled to occur, the head is first repositioned to align read element 725 with the B bursts 705 (position 708). Repositioning is accomplished in one of several ways. For example, where the read to write element offset (Wo) is known for a particular disk drive or family of disk drives, a predetermined shift of the nominal average reference level is used to properly position the readback element 725 prior to normalization measurement step 334. Alternatively, the read element 725 is servoed to a position between bursts, rather than to a single burst, e.g. to the A=C position with B centered (where the A burst amplitude equals the C burst amplitude). This causes the read element 725 to be centered on the intermediate bursts B 705 (position 708) regardless of read to write element offset. With the read element 725 aligned to the B bursts 705, the readback amplitude is at a maximum and the B burst amplitude reference values are measured accurately. Note that servoing to a pair of bursts any even number of steps apart will always guarantee a burst centered under the read element 725. For example at the A=E point, C is centered. Yet another alternative is to back up the read element 725 until a maximum readback signal amplitude has been detected, e.g. from burst B 705. When the readback signal has reached a maximum amplitude., the read head will be aligned with the burst of interest.

Although offset adjustment adds time to the normalization sequence, total servowriting time is reduced by only performing normalization when required.

VI. Conclusion

In summary, accurate positioning of the servo head is critical in a disk file equipped to perform self-servowriting. In a previously disclosed self-servowriting system, accuracy was attained by updating reference values used to position the transducer a track-by-track basis to compensate for track to track variations in an indicium of transducer position. Such accuracy came at the cost of increased servowriting time. It has been found, however, that self-servowriting time may be reduced in a slowly varying system by limiting the number of updates to the reference values. Accuracy is further enhanced when using dual-element heads by adjusting for head offset prior to updating.

A number of specific embodiments have been described encompassing the present invention. Nevertheless, it will be understood that various modifications may become apparent to those having ordinary skill in the art of self servo propagation without departing from the spirit and the scope of the present invention. Accordingly, it is to be understood that the invention is not to be limited by the specific illustrated embodiments, but only by the scope of the appended claims.

What is claimed is:

1. A self-servowriting system, comprising:

a storage medium;

a positionable transducer assembly for reading and writing a plurality of tracks, including position information, on the storage medium;

a measuring circuit for measuring an indicium of the transducer position;

storage for storing a reference value;

a determining circuit for determining, while the transducer is moving in a direction transverse to the direction of the tracks, whether the measured indicium has changed in a predefined manner relative to the reference value, and if so, generating an indicator;

a servo system for positioning the transducer relative to the storage medium, the servo system substantially halting transverse movement of the transducer relative to the storage medium in response to the indicator; and a controller for updating the reference value when the transducer is positioned at some, but not others, of the tracks written to the storage medium.

2. The system of claim 1, wherein the indicium comprises the amplitude of a readback signal from the transducer.

3. The system of claim 2, wherein the reference value comprises a normalization amplitude value.

4. The system of claim 3, wherein the determining circuit determines whether the readback signal amplitude has been reduced by a desired amount relative to the normalization amplitude value.

5. The system of claim 2, wherein the determining circuit determines the difference between the readback signal amplitude and the normalization amplitude value, and determines if the difference is equal to an amplitude reduction reference value.

6. The system of claim 1, wherein the reference value is updated by measuring the indicium while the transducer is positioned on a track, and replacing the reference value with the measured indicium value.

7. The system of claim 3, wherein the normalization amplitude value is updated while the transducer is reading a track by measuring an amplitude of the readback signal, and replacing the normalization amplitude value with the measured readback amplitude.

8. The system of claim 1, wherein prior to updating, the measuring circuit measures the indicium when the transducer is positioned on a first track, again measures the indicium when the transducer is positioned at a second track, and the determining circuit determines the variation between the first and second measured indicium values.

9. The system of claim 8, wherein updating is only performed if the determined variation exceeds a threshold value.

10. The system of claim 8, wherein the indicium is the amplitude of a readback signal obtained from the transducer assembly while reading a track.

11. The system of claim 1, wherein the controller updates the reference value at every Nth written track, where N is a fixed interval.

12. The system of claim 1, wherein the reference value is updated at every Nth track, where N is a variable interval.

13. The system of claim 1, wherein the reference amplitude is updated at every Nth track, and wherein N is initially a preselected value, and is subsequently increased or decreased based upon the amount of variation between successive measurements of the indicium.

14. The system of claim 13, wherein N is increased if the amount of variation is below a threshold value.

15. The system of claim 13, wherein N is decreased if the amount of variation is above a threshold value.

16. The system of claim 6, wherein the transducer comprises separate read and write elements.

17. The system of claim 16, wherein the servo system aligns the read element to the track prior to measuring the indicium.

18. The system of claim 17, wherein the servo system aligns the read element by moving it in the direction of the track by a predefined offset.

19. The system of claim 17, further comprising a readback signal amplitude measuring circuit for measuring the amplitude of a readback signal from the transducer, the circuit measuring the readback signal amplitude as the transducer moves transversely toward the track and the servo system halting the transverse movement when the readback signal amplitude is determined to have reached a maximum level.

20. The system of claim 17, wherein the storage medium includes at least first, second and third tracks, and wherein the servo system aligns the read head by moving the read element to a position between the first and third tracks and servoing to position information on the at least first and third tracks to maintain the transducer position.

21. The system of claim 1, wherein each track comprises a plurality of propagation bursts.

22. The system of claim 21, wherein each propagation burst is associated with a reference value.

23. The system of claim 22, wherein the servo system moves the transducer transversely away from the track while the measuring circuit measures the indicium at each propagation burst of the track until the determining circuit indicates that each measured indicium value has been changed in the predefined manner relative to the associated reference value.

24. The system of claim 22, wherein the controller updates each reference value of a track by measuring the indicium at each propagation burst passing the transducer and replacing the reference value of the burst with the measured indicium.

25. The system of claim 1, wherein each of at least first and second tracks written has an associated reference value, and wherein the reference value of the second track is updated by measuring the indicium while the transducer is positioned on the first track, measuring the indicium while the transducer is positioned on the second track, averaging the measured indicium values, and replacing the reference value associated with the second track with the averaged indicium value.

26. The system of claim 22, wherein the plurality of propagation bursts of a first track have a one-to-one correspondence with the plurality of propagation bursts of at least a second track, and wherein updating at the at least second track is performed by measuring the indicium at each propagation burst of the first track, measuring the indicium at each propagation burst of the at least second track, averaging the measured indicium values for each pair of corresponding bursts, and updating the reference value of each propagation burst of the second track with the corresponding averaged value.

* * * * *

UNITED STATES PATENT AND TRADEMARK OFFICE
CERTIFICATE OF CORRECTION

PATENT NO. : 6,469,859 B1
DATED : October 22, 2002
INVENTOR(S) : Chainer et al.

It is certified that error appears in the above-identified patent and that said Letters Patent is hereby corrected as shown below:

<u>Drawings,</u>
Figure 1, number 42, "SUBTRACTER" should read -- SUBTRACTOR --.

<u>Column 2,</u>
Line 51, "transducer" should read -- transducer. --

<u>Column 3,</u>
Line 9, "disc" should read -- disk --.
Line 61, "drives" should read -- drive --.

<u>Column 4,</u>
Line 7, "represent" should read -- represented --.

<u>Column 5,</u>
Line 12, "which the" should read -- which solves the --.
Line 23, "normalization-values" should read -- normalization values --.

<u>Column 6,</u>
Line 56, ".and its." should read -- and its --.
Line 63, "output." should read -- output --.

<u>Column 9,</u>
Line 61, "in it" should read -- in --.

<u>Column 10,</u>
Line 53, "an." should read -- an --.

<u>Column 12,</u>
Line 1, "loop." should read -- loop --.
Line 33, "accuracy. ." should read -- accuracy. --.
Line 38, "N," should read -- N --.

<u>Column 13,</u>
Line 40, "head" should read -- the head --.
Line 47, "OD." should read -- OD --.

UNITED STATES PATENT AND TRADEMARK OFFICE
CERTIFICATE OF CORRECTION

PATENT NO.     : 6,469,859 B1
DATED          : October 22, 2002
INVENTOR(S)    : Chainer et al.

It is certified that error appears in the above-identified patent and that said Letters Patent is hereby corrected as shown below:

<u>Column 14,</u>
Line 8, "amplitude.," should read -- amplitude, --.
Line 18, "transducer a" should read -- transducer on a --.

Signed and Sealed this

Eleventh Day of February, 2003

JAMES E. ROGAN
*Director of the United States Patent and Trademark Office*